US008819804B1

(12) United States Patent
Sankruthi (10) Patent No.: US 8,819,804 B1
(45) Date of Patent: Aug. 26, 2014

(54) DISTRIBUTED ENFORCEMENT OF BROWSER RULES

(75) Inventor: Anand D. Sankruthi, Chennai (IN)

(73) Assignee: Symantec Corporation, Mountain View, CA (US)

(*) Notice: Subject to any disclaimer, the term of this patent is extended or adjusted under 35 U.S.C. 154(b) by 131 days.

(21) Appl. No.: 12/915,837

(22) Filed: Oct. 29, 2010

(51) Int. Cl.
*G06F 7/04* (2006.01)
*H04L 29/06* (2006.01)
*G06F 21/60* (2013.01)

(52) U.S. Cl.
CPC ......... *H04L 63/107* (2013.01); *H04L 29/06823* (2013.01); *G06F 2221/2111* (2013.01); *G06F 2221/2113* (2013.01); *G06F 21/604* (2013.01)
USPC ............. 726/10; 709/224; 709/225; 705/319; 713/183

(58) Field of Classification Search
CPC .......... G06F 21/604; G06F 2221/2113; G06F 2221/2111; H04L 29/06823; H04L 63/107
USPC ............. 726/1–7, 10; 709/223–225; 705/319; 713/182–183
See application file for complete search history.

(56) References Cited

U.S. PATENT DOCUMENTS

| 2005/0198319 | A1* | 9/2005 | Chan et al. ................... 709/228 |
| 2005/0216300 | A1* | 9/2005 | Appelman et al. .............. 705/1 |
| 2009/0100066 | A1* | 4/2009 | McAfee ........................ 707/10 |
| 2010/0162342 | A1* | 6/2010 | Piepenbrink et al. ......... 725/132 |

OTHER PUBLICATIONS

Thanh, Do van, et al; "NETp1-09: Enhancing Internet Service Security Using GSM SIM Authentication"; Global Telecommunications Conference, 2006. GLOBECOM '06. IEEE; Digital Object Identifier: 10.1109/GLOCOM.2006.235 Publication Year: 2006 , pp. 1-5.*

* cited by examiner

*Primary Examiner* — Pramila Parthasarathy
*Assistant Examiner* — Angela Holmes
(74) *Attorney, Agent, or Firm* — Campbell Stephenson LLP (57) ABSTRACT

Various systems and methods distribute enforcement of browser rules. For example, one method can involve receiving, from a browser control client, information indicating that a user is accessing the Internet via a browser. The information received from the client can include a login name submitted by the user via the browser. The browser is installed on a computing device, and the browser control client is also installed on the computing device. The method can then send, to the browser control client, a set of one or more browser rules associated with the login name for enforcement on the computing device, in response to receipt of the information.

22 Claims, 4 Drawing Sheets

DISTRIBUTED ENFORCEMENT OF BROWSER RULES

FIELD OF THE INVENTION

This invention relates to browser control systems that enforce browsing rules.

DESCRIPTION OF THE RELATED ART

There are many situations in which it is desirable for an administrator to restrict the ability of a user to access certain networked sites, services, or content via a browser. For example, in a workplace, an administrator may restrict some users from accessing websites (such as video collection websites) known to be largely unrelated to workplace duties that also consume a large amount of network bandwidth. Similarly, parents may restrict their children's access to certain websites that contain material deemed inappropriate for young children. Unfortunately, existing systems are often limited in their applicability.

SUMMARY OF THE INVENTION

Various systems and methods for distributing enforcement of browser rules are disclosed. One such method can be performed, for example, by a browser control system server and can involve receiving, from a browser control client, information indicating that a user is accessing the Internet via a browser. The browser control client can, for example, be a tool configured to allow parental control of a child's Internet usage. The information received from the client can include a login name submitted by the user via the browser. For example, the login name can be submitted by the user to access a social networking web site via the browser.

The browser is installed on a computing device, and the browser control client is also installed on the computing device. The method can then send, to the browser control client, a set of one or more browser rules associated with the login name for enforcement on the computing device, in response to receipt of the information.

The method can also involve receiving the set of one or more browser rules and the login name to associate with the set of one or more browser rules from a second browser control client. The second browser control client is installed on a second computing device. Each of the browser control client and the second browser control client is managed by a different administrator.

In other embodiments, a method can, for example, be performed by a browser control client. Such a method can involve detecting entry of a login name into a browser by a user of a computing device. In response to detecting the entry of the login name, the method can send information to a browser control server. The information can include the login name and an identity of a web site or Internet service to which the user is logging into via the browser. The method can then receive, from the browser control server, a set of one or more browser rules associated with the login name for enforcement on the computing device, subsequent to sending the information to the server.

The set of one or more browser rules and the login name associated with the set of one or more browser rules can be configured via a second browser control client. The second browser control client is installed on a second computing device. Each of the browser control client and the second browser control client is managed by a different administrator.

An example of a system can include one or more processors and memory coupled to the processors. The memory stores program instructions executable to perform a method like the one described above. Similarly, such program instructions can be stored upon a computer readable storage medium.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

Figure 1:
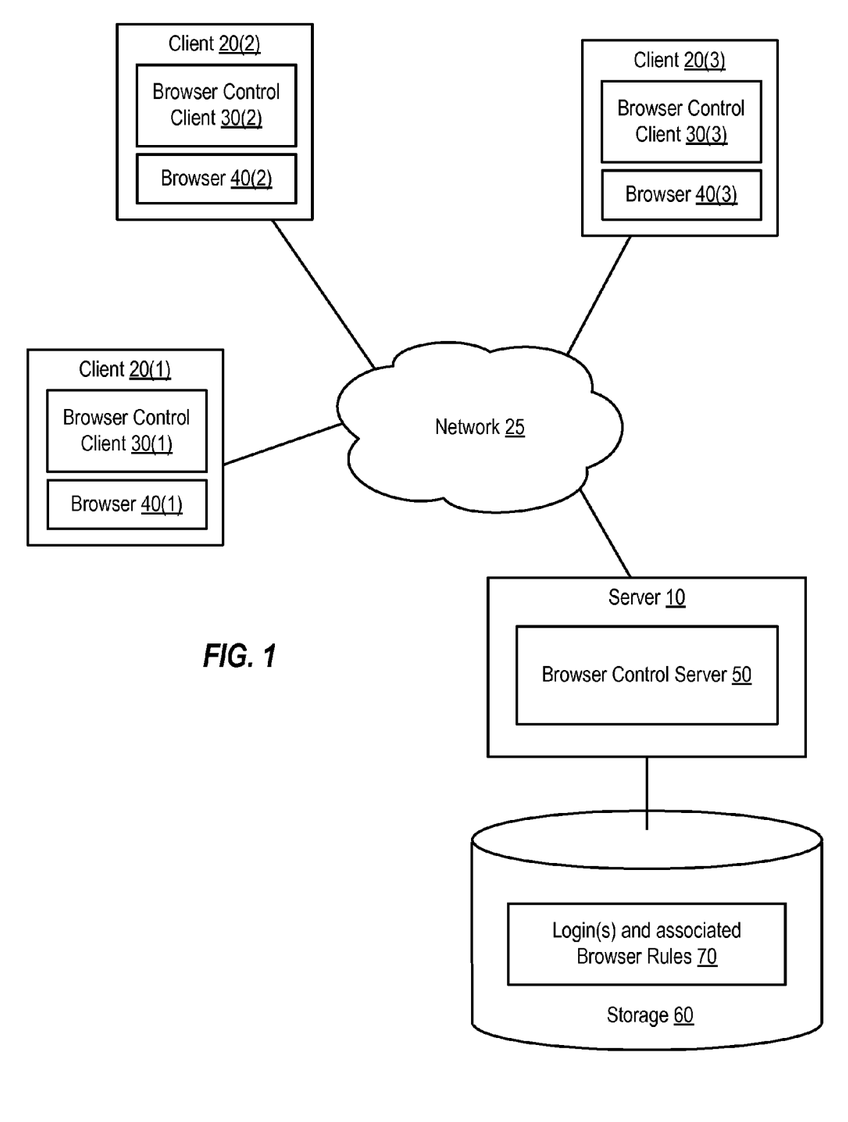
FIG. 1 is a block diagram of a system that distributes enforcement of browser rules, according to one embodiment of the present invention.

FIG. 1 is a block diagram of a computing system that includes a browser control system that distributes enforcement of browser rules. In particular, this system associates one or more sets of login information for certain web sites and/or services with a set of browser rules. This association can be created by an administrator who accesses the system via a first computing device. If a user logs into one of those web sites and/or services using one of the sets of login information stored by the system, the system will apply the associated browser rules to the browser(s) currently being used by the user, even if the user accesses the web via a computing device other than the one used by the administrator. Accordingly, the system can detect the user's accessing the web via a browser, based upon the user submitting the login information, from any computing device configured to participate in the system. The system can then apply the associated browser rules to the user's current computing device.

As shown, the system of FIG. 1 includes a server 10 that is coupled to several clients 20(1), 20(2), and 20(3) by a network 25. Each client implements a browser control client and one or more browsers. In particular, client 20(1) implements browser control client 30(1) and browser 40(1), client 20(2) implements browser control client 30(2) and browser 40(2), and client 20(3) implements browser control client 30(3) and browser 40(3).

Server 20 implements a parental control server 50. Server 20 is coupled to storage 60, which stores one or more sets of login information ("logins") and associated browser rules 70.

Clients 20(1), 20(2), and 20(3) and server 10 can each include one or more computing devices. Such computing devices can include servers, personal computing devices, laptop computers, net books, personal digital assistants, cellular phones, or the like.

Storage 60 can include one or more of a variety of different storage devices, including hard drives, compact discs, digital versatile discs, solid state drive (SSD) memory such as Flash memory, and the like, or one or more logical storage devices such as volumes implemented on one or more such physical storage devices. Storage 60 may also include arrays of such storage devices. Storage 60 can be included within, directly connected to, or connected via a network to server 10.

Each browser 40(1), 40(2), and 40(3) is a software module that is configured to display, play, and/or otherwise provide access to a web site or service. Such web sites and services can include typical web sites, which are collections of one or more web pages and associated audio, image, text, and video content, as well as other services, such as instant messaging (IM), networked gaming, electronic mail (email), and the like.

In some embodiments, browser control server 50 and browser control clients 30(1), 30(2), and 30(3) are used to implement a parental control system that allows parents or other adults to control the web access of one or more children. Such a system allows a parent to specify one or more browser rules for each child. Such browser rules can: restrict all access to a web site (e.g., in situations in which the default control rule allows access to web sites unless explicitly restricted), restrict some access to a web site (e.g., by limiting the amount of time per day that the child can spend accessing that web site or by limiting access to certain time periods), allow all access to a web site (e.g., in situations in which the default control rule blocks access to all web sites unless explicitly allowed), allow access to an instant messaging service, restrict communication with and/or limit communication to certain instant messaging users, and the like. Restrictions can be specified on a site-by-site (or service-by-service) basis, or based upon the content (e.g., certain keywords within a web page) of the site or service. Similar systems can be used to control the browsing ability of other, non-child users.

Each browser control client is controlled by an administrator. For example, if a browser control client is part of a parental control system, that browser control client is controlled by one or more parents. Administrators are the only users allowed to establish and modify browser rules via the browser control client. These administrators can then establish rules for one or more other uses (e.g., children), at least some of whom may not be administrators. In the system of FIG. 1, each browser control client can be independently controlled by a different administrator. Administrators of different browser control clients are not necessarily affiliated in any way, other than by their use of a browser control client that communicates with the same browser control server as each other browser control client.

The browser control clients 30(1), 30(2), and 30(3) and browser control server 50 can all be provided by the same manufacturer in some embodiments. In other embodiments, browser control clients provided by different manufacturers can be configured to communicate with the same browser control server in order to facilitate distributed enforcement of browser rules, as described in more detail below.

The system shown in FIG. 1 allows the browser rules specified by an administrator of one browser control client to be applied to users of systems that include other browser control clients than the one used to specify the rules, even if those other systems are maintained by different administrators (e.g., different parents) and/or are implemented on different computing devices, so long as each of the browser control clients is configured to communicate with the same browser control server (or set of browser control servers).

As an example, one parent (acting as administrator) can configure browsing control rules for a child via browser control client 30(1) on client 20(1). These rules can be saved locally and used to control the child's use of browser 40(1) on client 20(1). Additionally, these rules can be stored by parental control server 50 in storage 60. If the child then goes over to a friend's house and uses client 20(2) to browse the web, the system can identify the child (as described in more detail below) and apply the browser rules configured by the child's parent via client 20(1) to the child's use of browser 40(2) on client 20(2).

To allow browser rules to be enforced on computing devices other than the computing device used to configure those rules, a browser control client can prompt an administrator for login information to associate with the rule(s) associated with a particular user. Such login information can include the login name that the user uses to log into an electronic mail account, the login name that the user uses to login to an instant messaging client, the login name that the user uses to login to a social networking site, and the like.

In general, any login name can be associated with the browser rules for a particular user. However, to increase the likelihood that the user will be identified by the distributed browser control enforcement system, the login name is preferably one used by the user relatively frequently (e.g., if the child is known to typically access Facebook™ each time the child accesses the Internet, the child's Facebook login can be provided). Similarly, multiple such login names can be associated with the browser rule in order to increase the likelihood that the user's activity within the system will be detected. For example, a child's Facebook™, electronic mail, and instant messaging logins can all be provided to the browser control system.

Typically, Internet users access certain sites at the start of each Internet access session. For example, users typically check email and/or social networking sites such as Facebook before checking other web sites. Thus, by detecting the users based upon their logins to such sites via a particular client, the users' browsing can then be controlled for the rest of the time that user accesses the Internet via the same client.

After receiving login names and browser rules for a particular user from an administrator, a browser control client forwards that information to browser control server 50 for storage in storage 60. The information can include a web site or service identifier (e.g., in the form of a uniform resource locator (URL), domain name, Internet protocol (IP) address or range of addresses, service name (e.g., the name of a specific instant messaging service), or the like), the login name used to access that web site or service, and one or more associated browser rules. The information can include additional login names and web site or service identifiers, if available. The information can also include additional information identifying the user (e.g., by the child's name or nickname, as used by the administrator to differentiate among different users). The information can be secured (e.g., via password protection, encryption, encoding, or the like) prior to transmission to the browser control server.

Each browser control client is configured to monitor the activity of each browser installed on the same client as the browser control client in order to detect when login names are entered to gain access to particular web sites and services. In response to detecting the entry of a login name, the browser control client sends the login name and information identifying the web site or service being logged into to the browser control server. For example, if browser control client 30(3) detects the entry of a particular login name to a particular web site via browser 40(3), browser control client 30(3) can send that login name and information identifying the web site to browser control server 50.

In some embodiments, each browser control client includes a browser plug-in that is configured to detect the input of a login name to a web site or service. In other embodiments, each browser control client may implement a daemon or service that captures and snoops Internet packets and extracts login information from those Internet packets. In still other embodiments, the browser control client can include or interface to a module such as the GetForeGround and GetWindowText application programming interfaces (APIs) provided by the Windows™ operating system that allows the browser control client to extract information from, for example, a chat window. Thus, the browser control client can obtain information about the usage of an Internet service (e.g., such as an instant messaging chat window), which can be used to detect a login to an Internet service. Some browser control clients may include multiple different types of technologies for detecting the entry of login information by a user.

In general, the login name (and the web site or other Internet service that the login name is being used to access) that is associated with a browser rule is not a login name used to access a client computing device or a browser control client. Instead, this login name is associated with a web site or other Internet service that is likely to be completely independent of and unrelated to the browser control system, except that the browser control system may subsequent control access to that web site or Internet service via a particular browser on a particular client.

In response to receiving a login name and information identifying a particular web site or service, browser control server 50 then compares the received login name and identifying information to the information included in login(s) and associated browser rules 70. If a match is found, browser control server 50 retrieves the associated browser rules and sends those browser rules to the browser control client that detected the login name. The information can be secured (e.g., via password protection, encryption, encoding, or the like) prior to transmission to the browser control client.

In response to receiving a set of browser rules from browser control server 50, the browser control client will, if needed, decrypt, decode, or otherwise unlock the browser control rules. The browser control client then begins enforcing the browser rules on the client on which the browser control client is installed, in a manner similar to as if the browser rules had been configured directly on that client by the client's administrator.

The browser rules that are provided to a browser control client by browser control server 50 can timeout or otherwise become unenforceable by that browser control client after a certain period, so that normal functioning of that browser control client (as configured by that browser control client's administrator) will resume. For example, a browser control client can be configured to enforce the received set of browser rules for three hours after receipt of the browser rules from the browser control server or for three hours since the last login identifying the user for whom the browser rules were received is detected by that browser control client. Alternatively, the browser rules can continue to be enforced until the local administrator of the browser control client logs in and selects to stop enforcement of the received browser rules.

A browser control client can allow administrators to specify whether browser rules entered via that browser control client are to be enforced in a distributed manner and, if so, whether those browser rules can be displayed to administrators of other browser control clients on which those browser rules are enforced. For example, a parent administrator for browser control client 30(1) can specify that distributed enforcement is desired but that the browser rules for a particular child should be kept confidential. If the child for whom the browser rules were configured later is detected using client 30(3) (e.g., at school or a library) by browser control client 30(3), browser control client 30(3) will receive and enforce the configured browser rules. However, an administrator for browser control client 30(3) will only be able to see that a set of browser rules configured by another administrator of a different client has been downloaded from browser control server 50 and will not be able to see detailed information about what those rules specify or who the rules were specified by.

In some situations, browser rules can be sent from browser control server 50 to a browser control client for which browser rules are already in place. In these situations, the browser control client and/or received browser rules may specify whether the browser control client should enforce only the received browser rules (and thus cease enforcing any locally configured or previously received browser rules) or enforce a combination of both the locally configured and/or any previously received browser rules. Rules for resolving conflicts between locally configured and downloaded browser rules can also be configured or prespecified (e.g., such that the most restrictive rules are always enforced).

Figure 2:
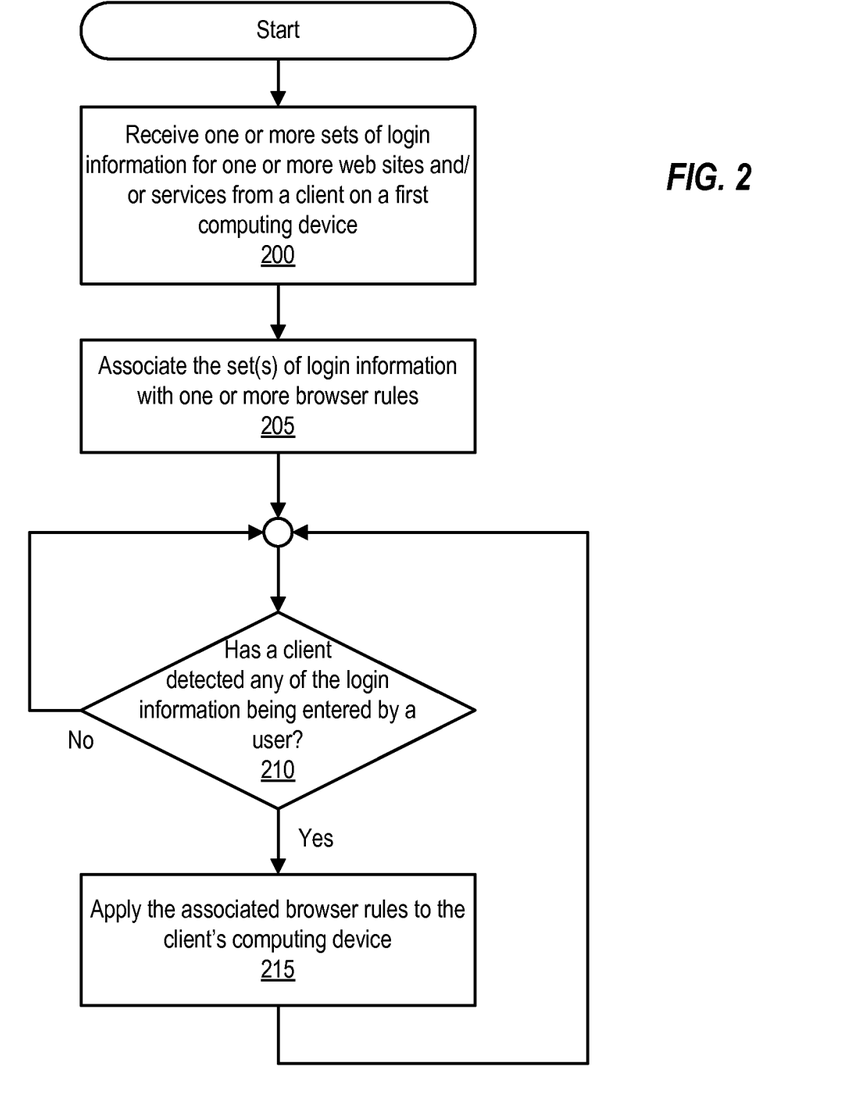
FIG. 2 is a flowchart of a method of distributing enforcement of browser rules, according to embodiments of the present invention.

FIG. 2 is a flowchart of a method of distributing the enforcement of browser rules, such that rules configured on one computing device can be enforced on another computing device. This method can be performed by an browser control server, such as browser control server 50 of FIG. 1, operating in conjunction with one or more browser control clients, such as browser control clients 30(1), 30(2), and 30(3) module that includes a backup interface, like archival module 50 of FIG. 1.

The method of FIG. 2 begins when a browser control server receives a one or more sets of login information (e.g., a login name and information identifying a web site or Internet service that the login name is used to access) from a browser control client operating on a computing device, as shown at 200. The browser control server then associates the set(s) of login information with one or more browser rules, as shown at 205. The browser rules were also received from the same browser control client and are associated with the same user as the one or more sets of login information.

Subsequently, the browser control server can receive information indicating that another browser control client has detected the entry of one or more of the logins included in the set(s) of login information by a user, as shown at 210. For example, a browser control server can receive a login name and information identifying a web site that a user is logging into using the login name from a browser control client installed on the computing device currently being used by the user.

In response to receiving such information, the browser control server operates in conjunction with the browser control client that detected the user's entry of the login name to apply the browser rules associated with the login name to the computing device on which that browser control client is installed, as shown at 215. To do this, the browser control server can search a database or other store of browser rules and associated login information in order to find a set of login information that matches the received login name. The browser control server can then retrieve the browser rules associated with that set of login information and send that information to the browser control client that detected the user's entry of the login name. The browser control client receives these rules and enforces the rules on the computing device on which the browser control client is installed. It is noted that the browser control client that detects the user's entry of the login name can be different than the browser control client that configured the browser rules for that user.

The operations shown in FIG. 2 can be performed for each of several users whose browser access is being controlled by the system. Some operations may be omitted in certain embodiments, and other embodiments may include other operations instead of and/or in addition to those depicted in FIG. 2.

Figure 3:
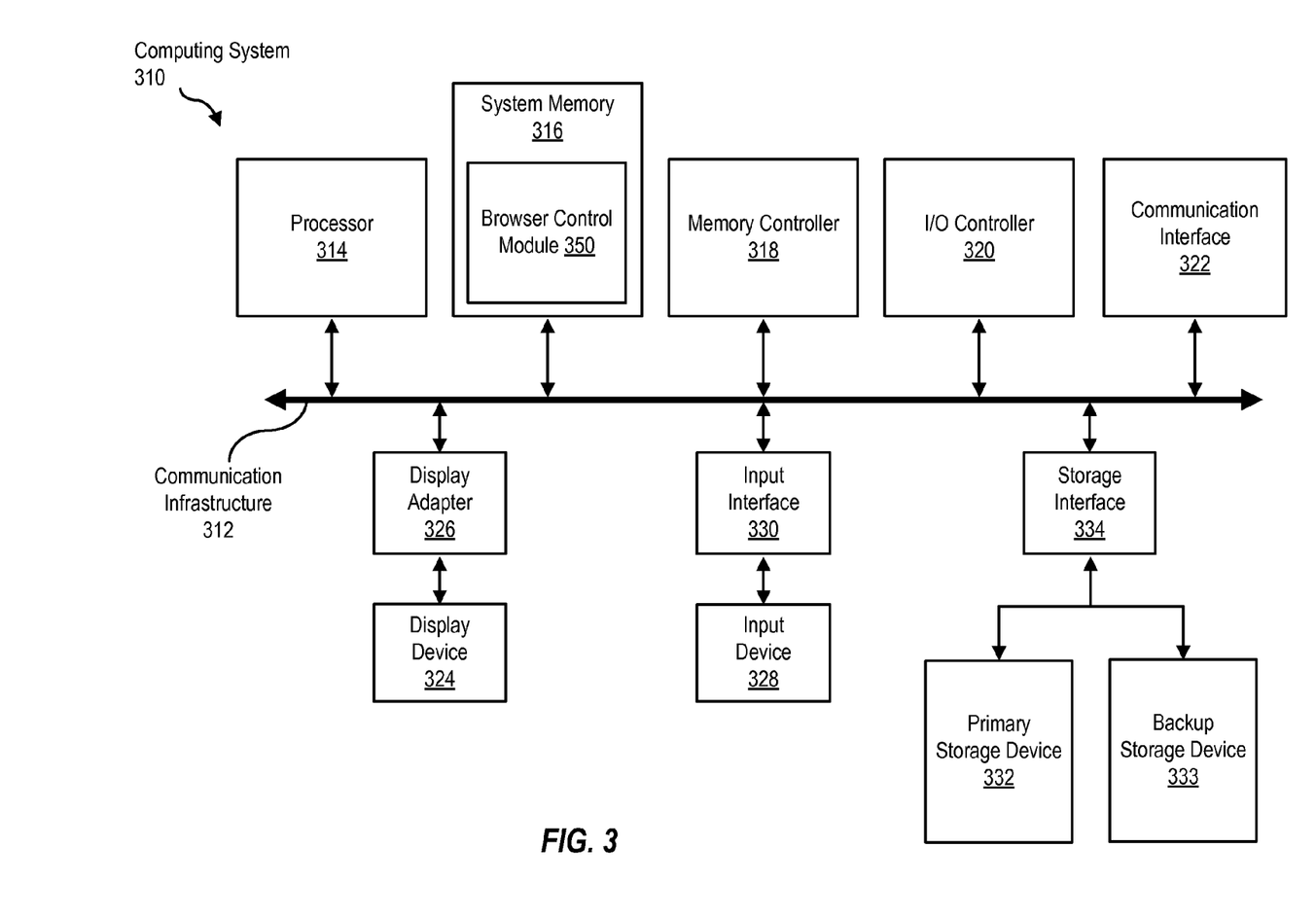
FIG. 3 is a block diagram of a computing device, illustrating how a distributed browser control system can be implemented in software, according to one embodiment of the present invention.

FIG. 3 is a block diagram of a computing system 310 capable of implementing a distributed browser control enforcement system as described above. Computing system 310 broadly represents any single or multi-processor computing device or system capable of executing computer-readable instructions. Examples of computing system 310 include, without limitation, any one or more of a variety of devices including workstations, personal computers, laptops, client-side terminals, servers, distributed computing systems, hand-held devices (e.g., personal digital assistants and mobile phones), network appliances, storage controllers (e.g., array controllers, tape drive controller, or hard drive controller), and the like. In its most basic configuration, computing system 310 may include at least one processor 314 and a system memory 316. By executing the software that implements a browser control module 350 (e.g., a browser control client and/or a browser control server, as described above), computing system 310 becomes a special purpose computing device that is configured to participate in a distributed browser control enforcement system.

Processor 314 generally represents any type or form of processing unit capable of processing data or interpreting and executing instructions. In certain embodiments, processor 314 may receive instructions from a software application or module. These instructions may cause processor 314 to perform the functions of one or more of the embodiments described and/or illustrated herein. For example, processor 314 may perform and/or be a means for performing all or some of the operations described herein. Processor 314 may also perform and/or be a means for performing any other operations, methods, or processes described and/or illustrated herein.

System memory 316 generally represents any type or form of volatile or non-volatile storage device or medium capable of storing data and/or other computer-readable instructions. Examples of system memory 316 include, without limitation, random access memory (RAM), read only memory (ROM), flash memory, or any other suitable memory device. In one example, program instructions implementing a browser control module 350 may be loaded into system memory 316.

In certain embodiments, computing system 310 may also include one or more components or elements in addition to processor 314 and system memory 316. For example, as illustrated in FIG. 3, computing system 310 may include a memory controller 318, an Input/Output (I/O) controller 320, and a communication interface 322, each of which may be interconnected via a communication infrastructure 312. Communication infrastructure 312 generally represents any type or form of infrastructure capable of facilitating communication between one or more components of a computing device. Examples of communication infrastructure 312 include, without limitation, a communication bus (such as an Industry Standard Architecture (ISA), Peripheral Component Interconnect (PCI), PCI express (PCIe), or similar bus) and a network.

Memory controller 318 generally represents any type or form of device capable of handling memory or data or controlling communication between one or more components of computing system 310. For example, in certain embodiments memory controller 318 may control communication between processor 314, system memory 316, and I/O controller 320 via communication infrastructure 312. In certain embodiments, memory controller 318 may perform and/or be a means for performing, either alone or in combination with other elements, one or more of the operations or features described and/or illustrated herein.

I/O controller 320 generally represents any type or form of module capable of coordinating and/or controlling the input and output functions of a computing device. For example, in certain embodiments I/O controller 320 may control or facilitate transfer of data between one or more elements of computing system 310, such as processor 314, system memory 316, communication interface 322, display adapter 326, input interface 330, and storage interface 334.

Communication interface 322 broadly represents any type or form of communication device or adapter capable of facilitating communication between computing system 310 and one or more additional devices. For example, in certain embodiments communication interface 322 may facilitate communication between computing system 310 and a private or public network including additional computing systems. Examples of communication interface 322 include, without limitation, a wired network interface (such as a network interface card), a wireless network interface (such as a wireless network interface card), a modem, and any other suitable interface. In at least one embodiment, communication interface 322 may provide a direct connection to a remote server via a direct link to a network, such as the Internet. Communication interface 322 may also indirectly provide such a connection through, for example, a local area network (such as an Ethernet network), a personal area network, a telephone or cable network, a cellular telephone connection, a satellite data connection, or any other suitable connection.

In certain embodiments, communication interface 322 may also represent a host adapter configured to facilitate communication between computing system 310 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Serial Advanced Technology Attachment (SATA), Serial Attached SCSI (SAS), and external SATA (eSATA) host adapters, Advanced Technology Attachment (ATA) and Parallel ATA (PATA) host adapters, Fibre Channel interface adapters, Ethernet adapters, or the like.

Communication interface 322 may also allow computing system 310 to engage in distributed or remote computing. For example, communication interface 322 may receive instructions from a remote device or send instructions to a remote device for execution.

As illustrated in FIG. 3, computing system 310 may also include at least one display device 324 coupled to communication infrastructure 312 via a display adapter 326. Display device 324 generally represents any type or form of device capable of visually displaying information forwarded by display adapter 326. Similarly, display adapter 326 generally represents any type or form of device configured to forward graphics, text, and other data from communication infrastructure 312 (or from a frame buffer, as known in the art) for display on display device 324.

As illustrated in FIG. 3, computing system 310 may also include at least one input device 328 coupled to communication infrastructure 312 via an input interface 330. Input device 328 generally represents any type or form of input device capable of providing input, either computer or human generated, to computing system 310. Examples of input device 328 include, without limitation, a keyboard, a pointing device, a speech recognition device, or any other input device.

As illustrated in FIG. 3, computing system 310 may also include a primary storage device 332 and a backup storage device 333 coupled to communication infrastructure 312 via a storage interface 334. Storage devices 332 and 333 generally represent any type or form of storage device or medium capable of storing data and/or other computer-readable instructions. For example, storage devices 332 and 333 may each include a magnetic disk drive (e.g., a so-called hard drive), a floppy disk drive, a magnetic tape drive, an optical disk drive, a flash drive, or the like. Storage interface 334 generally represents any type or form of interface or device for transferring data between storage devices 332 and 333 and other components of computing system 310. A storage device like primary storage device 332 can be used to store login(s) and associated browser rules, as described above.

In certain embodiments, storage devices 332 and 333 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 332 and 333 may also include other similar structures or devices for allowing computer software, data, or other computer-readable instructions to be loaded into computing system 310. For example, storage devices 332 and 333 may be configured to read and write software, data, or other computer-readable information. Storage devices 332 and 333 may also be a part of computing system 310 or may be a separate device accessed through other interface systems.

Many other devices or subsystems may be connected to computing system 310. Conversely, all of the components and devices illustrated in FIG. 3 need not be present to practice the embodiments described and/or illustrated herein. The devices and subsystems referenced above may also be interconnected in different ways from that shown in FIG. 3.

Computing system 310 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 310 for storage in memory via a network such as the Internet or upon a carrier medium.

The computer-readable medium containing the computer program may be loaded into computing system 310. All or a portion of the computer program stored on the computer-readable medium may then be stored in system memory 316 and/or various portions of storage devices 332 and 333. When executed by processor 314, a computer program loaded into computing system 310 may cause processor 314 to perform and/or be a means for performing the functions of one or more of the embodiments described and/or illustrated herein. Additionally or alternatively, one or more of the embodiments described and/or illustrated herein may be implemented in firmware and/or hardware. For example, computing system 310 may be configured as an application specific integrated circuit (ASIC) adapted to implement one or more of the embodiments disclosed herein.

Figure 4:
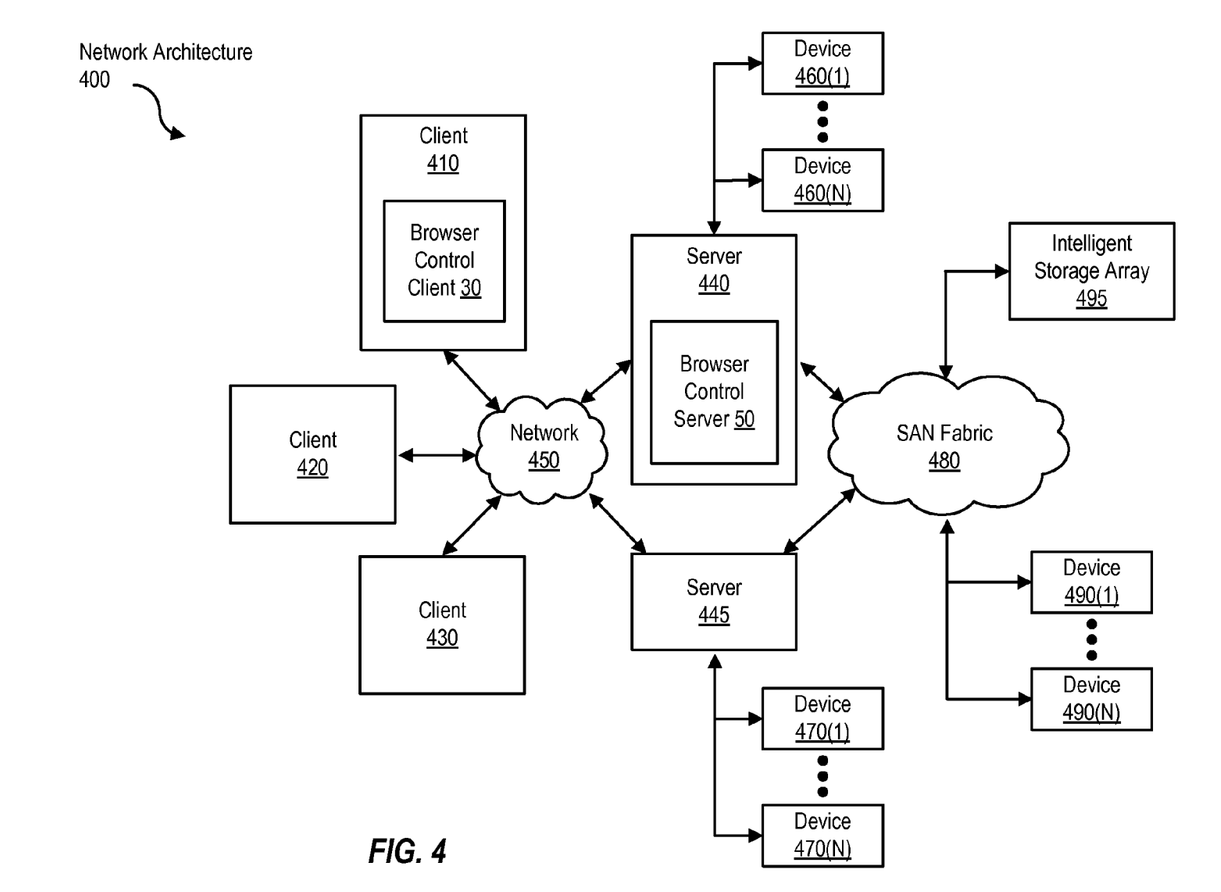
FIG. 4 is a block diagram of a networked system, illustrating how various computing devices can communicate via a network, according to one embodiment of the present invention.

FIG. 4 is a block diagram of a network architecture 400 in which client systems 410, 420, and 430 and servers 440 and 445 may be coupled to a network 450. Client systems 410, 420, and 430 generally represent any type or form of computing device or system.

Similarly, servers 440 and 445 generally represent computing devices or systems, such as application servers or database servers implemented on a computing device such as computing system 310 in FIG. 3, configured to provide various database services and/or run certain software applications. Network 450 generally represents any telecommunication or computer network including, for example, an intranet, a wide area network (WAN), a local area network (LAN), a personal area network (PAN), or the Internet. In one example, one or more of client systems 410, 420, and/or 430 may include a browser control client 30 and/or servers 440 and/or 445 may include a browser control server 50 as shown in FIG. 1.

As illustrated in FIG. 4, one or more storage devices 460(1)-(N) may be directly attached to server 440. Similarly, one or more storage devices 470(1)-(N) may be directly attached to server 445. Storage devices 460(1)-(N) and storage devices 470(1)-(N) generally represent any type or form of storage device or medium capable of storing data and/or other computer-readable instructions. In certain embodiments, storage devices 460(1)-(N) and storage devices 470(1)-(N) may represent network-attached storage (NAS) devices configured to communicate with servers 440 and 445 using various protocols, such as Network File System (NFS), Server Message Block (SMB), or Common Internet File System (CIFS).

Servers 440 and 445 may also be connected to a storage area network (SAN) fabric 480. SAN fabric 480 generally represents any type or form of computer network or architecture capable of facilitating communication between multiple storage devices. SAN fabric 480 may facilitate communication between servers 440 and 445 and a plurality of storage devices 490(1)-(N) and/or an intelligent storage array 495. SAN fabric 480 may also facilitate, via network 450 and servers 440 and 445, communication between client systems 410, 420, and 430 and storage devices 490(1)-(N) and/or intelligent storage array 495 in such a manner that devices 490(1)-(N) and array 495 appear as locally attached devices to client systems 410, 420, and 430. As with storage devices 460(1)-(N) and storage devices 470(1)-(N), storage devices 490(1)-(N) and intelligent storage array 495 generally represent any type or form of storage device or medium capable of storing data and/or other computer-readable instructions.

In certain embodiments, and with reference to computing system 310 of FIG. 3, a communication interface, such as communication interface 322 in FIG. 3, may be used to provide connectivity between each client systems 410, 420, and 430 and network 450. Client systems 410, 420, and 430 may be able to access information on server 440 or 445 using, for example, a web browser or other client software. Such software may allow client systems 410, 420, and 430 to access data hosted by server 440, server 445, storage devices 460(1)-(N), storage devices 470(1)-(N), storage devices 490(1)-(N), or intelligent storage array 495. Although FIG. 4 depicts the use of a network (such as the Internet) for exchanging data, the embodiments described and/or illustrated herein are not limited to the Internet or any particular network-based environment.

In at least one embodiment, all or a portion of one or more of the embodiments disclosed herein may be encoded as a computer program and loaded onto and executed by server 440, server 445, storage devices 460(1)-(N), storage devices 470(1)-(N), storage devices 490(1)-(N), intelligent storage array 495, or any combination thereof. All or a portion of one or more of the embodiments disclosed herein may also be encoded as a computer program, stored in server 440, run by server 445, and distributed to client systems 410, 420, and 430 over network 450.

In some examples, all or a portion of the computing devices in FIGS. 1, 3, and 4 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In addition, one or more of the components described herein may transform data, physical devices, and/or representations of physical devices from one form to another. For example, a backup control client in FIG. 1 may transform behavior of a computing device in order to cause the computing device to perform distributed enforcement of browser rules configured on another computing device.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
receiving information from a browser control client, wherein
the information is received at a browser control server
the information indicates that a user is attempting to access a web site via an internet, using a browser,
the information comprises
a login name and an identity of the web site,
the login name is submitted by the user via the browser in order to access the web site,
the login name is one of a plurality of login names associated with the user, and
the browser and the browser control client are installed on a computing device; and
in response to receipt of the information, sending a set of one or more browser rules to the browser control client, wherein
the set of one or more browser rules is configured to be enforced by the browser client by virtue of the set of one or more browser rules and the plurality of login names being associated with one another at the browser control server,
the one or more of the plurality of login names comprise the login name, and
enforcement of the set of one or more browser rules comprises resolving a conflict between a local set of one or more browser control rules and the set of one or more browser control rules.

2. The method of claim 1, wherein
the web site is a social networking web site.

3. The method of claim 1, further comprising:
receiving the set of one or more browser rules and the login name to associate with the set of one or more browser rules from a second browser control client, wherein
association of the set of one or more browser rules and the login name are associated with one another from the second browser control client is facilitated by virtue of the set of one or more browser rules and the login name being associated with one another at the browser control server,
the second browser control client is installed on a second computing device, and
each of the browser control client and the second browser control client is managed by a different administrator.

4. The method of claim 1, wherein
the browser control client is configured to allow control of access to the web site.

5. The method of claim 1, wherein
the set of one or more browser rules expires after a pre-specified time period.

6. The method of claim 1, wherein
the set of one or more browser rules is inaccessible by an administrator of the browser control client.

7. A method comprising:
detecting entry of a login name into a browser, wherein
the browser is installed on a computing device,
the detecting is performed by a browser control client installed on the computing device,
entry of the login name is performed to facilitate logging into a web site via the browser,
the login name is entered into the browser via a user input device of the computing device, and
the login name is one of a plurality of login names associated with a user;
in response to the detecting, sending information from the browser control client to a browser control server, wherein
the information comprises
the login name, and
an identity of the web site;
receiving, in response to the sending, a set of one or more browser rules from the browser control server, wherein
the set of one or more browser rules is received at the browser control client,
the set of one or more browser rules is configured to be enforced by the browser control client by virtue of the set of one or more browser rules and the plurality of login names being associated with one another at the browser control server,
the one or more of the plurality of login names comprise the login name, and
enforcement of the set of one or more browser rules comprises resolving a conflict between a local set of one or more browser control rules and the set of one or more browser control rules.

8. The method of claim 7, wherein
the web site is a social networking web site.

9. The method of claim 7, wherein
the set of one or more browser rules and the login name are configured via a second browser control client,
the second browser control client is installed on a second computing device,
association of the set of one or more browser rules and the login name are associated with one another from the second browser control client is facilitated by virtue of the set of one or more browser rules and the login name being associated with one another at the browser control server, and
each of the browser control client and the second browser control client is managed by a different administrator.

10. The method of claim 7, wherein
the browser control client is configured to allow control of access to the web site.

11. A non-transitory computer readable storage medium comprising program instructions executable to:
receive information from a browser control client, wherein
the information is received at a browser control server
the information indicates that a user is attempting to access a web site via an internet, using a browser,
the information comprises
a login name and an identity of the web site,
the login name is submitted by the user via the browser in order to access the web site,
the login name is one of a plurality of login names associated with the user, and
the browser and the browser control client are installed on a computing device; and
in response to receipt of the information, send a set of one or more browser rules to the browser control client, wherein
the set of one or more browser rules is configured to be enforced by the browser client by virtue of the set of one or more browser rules and the plurality of login names being associated with one another at the browser control server,
the one or more of the plurality of login names comprise the login name, and
enforcement of the set of one or more browser rules comprises resolving a conflict between a local set of one or more browser control rules and the set of one or more browser control rules.

12. The non-transitory computer readable storage medium of claim 11, wherein
the web site is a social networking web site.

13. The non-transitory computer readable storage medium of claim 11, wherein the program instructions are further executable to:
receive the set of one or more browser rules and the login name to associate with the set of one or more browser rules from a second browser control client, wherein
association of the set of one or more browser rules and the login name are associated with one another from the second browser control client is facilitated by virtue of the set of one or more browser rules and the login name being associated with one another at the browser control server,
the second browser control client is installed on a second computing device, and
each of the browser control client and the second browser control client is managed by a different administrator.

14. The non-transitory computer readable storage medium of claim 11, wherein
the browser control client is configured to allow control of access to the web site.

15. A non-transitory computer readable storage medium comprising program instructions executable to:
detect entry of a login name into a browser, wherein
the browser is installed on a computing device,
the detecting is performed by a browser control client installed on the computing device,
entry of the login name is performed to facilitate logging into a web site via the browser,
the login name is entered into the browser via a user input device of the computing device, and
the login name is one of a plurality of login names associated with a user;
send information from the browser control client to a browser control server, wherein
the information comprises
the login name, and
an identity of a web site;
in response to sending the information, receive a set of one or more browser rules from the browser control server, wherein
the set of one or more browser rules is received at the browser control client,
the set of one or more browser rules is configured to be enforced by the browser client by virtue of the set of one or more browser rules and the plurality of login names being associated with one another at the browser control server,
the one or more of the plurality of login names comprise the login name, and
enforcement of the set of one or more browser rules comprises resolving a conflict between a local set of one or more browser control rules and the set of one or more browser control rules.

16. The non-transitory computer readable storage medium of claim 15, wherein
the web site is a social networking web site, and
the set of one or more browser rules is configured to be enforced by the browser client by virtue of the set of one or more browser rules and the plurality of login names being associated with one another at the browser control server.

17. The non-transitory computer readable storage medium of claim 15, wherein
the set of one or more browser rules and the login name are configured via a second browser control client,
the second browser control client is installed on a second computing device,
association of the set of one or more browser rules and the login name are associated with one another from the second browser control client is facilitated by virtue of the set of one or more browser rules and the login name being associated with one another at the browser control server, and
each of the browser control client and the second browser control client is managed by a different administrator.

18. The non-transitory computer readable storage medium of claim 15, wherein
the browser control client is configured to allow control of access to the web site.

19. A system comprising:
one or more processors; and a memory coupled to the one or more processors and storing program instructions executable by the one or more processors to receive information from a browser control client, wherein
- the information is received at a browser control server
- the information indicates that a user is attempting to access a web site via an internet, using a browser,
- the information comprises
  - a login name and an identity of the web site,
- the login name is submitted by the user via the browser in order to access the web site,
- the login name is one of a plurality of login names associated with the user, and
- the browser and the browser control client are installed on a computing device; and in response to receipt of the information, send a set of one or more browser rules to the browser control client, wherein
- the set of one or more browser rules is configured to be enforced by the browser client by virtue of the set of one or more browser rules and one or more of the plurality of login names being associated with one another at the browser control server,
- the one or more of the plurality of login names comprise the login name, and
- enforcement of the set of one or more browser rules comprises resolving a conflict between a local set of one or more browser control rules and the set of one or more browser control rules.

20. The system of claim 19, wherein the program instructions are further executable to:

receive the set of one or more browser rules and the login name to associate with the set of one or more browser rules from a second browser control client, wherein
- association of the set of one or more browser rules and the login name are associated with one another from the second browser control client is facilitated by virtue of the set of one or more browser rules and the login name being associated with one another at the browser control server,
- the second browser control client is installed on a second computing device, and
- each of the browser control client and the second browser control client is managed by a different administrator.

21. A system comprising:
one or more processors; and
a memory coupled to the one or more processors and storing program instructions executable by the one or more processors to:

detect entry of a login name into a browser by a user of a computing device;

detect entry of a login name into a browser by, wherein
- the browser is installed on a computing device,
- the detecting is performed by a browser control client installed on the computing device,
- entry of the login name is performed to facilitate logging into a web site via the browser,
- the login name is entered into the browser via a user input device of the computing device, and
- the login name is one of a plurality of login names associated with a user;

send information from the browser control client to a browser control server, wherein
- the information comprises
  - the login name, and
  - an identity of a web site;

in response to sending the information, receive a set of one or more browser rules from the browser control server, wherein
- the set of one or more browser rules is received at the browser control client,
- the set of one or more browser rules is configured to be enforced by the browser control client by virtue of the set of one or more browser rules and the plurality of login names being associated with one another at the browser control server,
- the one or more of the plurality of login names comprise the login name, and
- enforcement of the set of one or more browser rules comprises resolving a conflict between a local set of one or more browser control rules and the set of one or more browser control rules.

22. The system of claim 21, wherein the set of one or more browser rules and the login name are configured via a second browser control client, the second browser control client is installed on a second computing device, association of the set of one or more browser rules and the login name are associated with one another from the second browser control client is facilitated by virtue of the set of one or more browser rules and the login name being associated with one another at the browser control server, and each of the browser control client and the second browser control client is managed by a different administrator.

* * * * *